United States Patent
Bolms

(10) Patent No.: US 6,682,300 B2
(45) Date of Patent: Jan. 27, 2004

(54) SEAL ELEMENT FOR SEALING A GAP AND COMBUSTION TURBINE HAVING A SEAL ELEMENT

(75) Inventor: Hans-Thomas Bolms, Muelheim a.d. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/117,584

(22) Filed: Apr. 4, 2002

(65) Prior Publication Data

US 2002/0168263 A1 Nov. 14, 2002

(30) Foreign Application Priority Data

Apr. 4, 2001 (GB) .............................................. 0108398

(51) Int. Cl.⁷ ................................................ F01D 11/08
(52) U.S. Cl. .................... 415/173.3; 415/139; 415/191; 277/230
(58) Field of Search ........................... 415/173.3, 173.1, 415/139, 191, 170.1, 174.2, 138, 135, 217; 277/230, 236, 229, 215

(56) References Cited

U.S. PATENT DOCUMENTS

| | | | | |
|---|---|---|---|---|
| 2,991,045 A | * | 7/1961 | Tassoni | |
| 3,966,356 A | * | 6/1976 | Irwin | 415/217 |
| 3,975,114 A | * | 8/1976 | Kalkbrenner | 415/217 |
| 3,986,789 A | * | 10/1976 | Pask | 415/178 |
| 4,465,284 A | * | 8/1984 | Szema | 277/22 |
| 4,524,980 A | * | 6/1985 | Lillibridge et al. | 277/199 |
| 5,145,316 A | * | 9/1992 | Birch | 415/173.1 |
| 5,509,669 A | * | 4/1996 | Wolfe et al. | 277/167.5 |
| 5,657,998 A | * | 8/1997 | Dinc et al. | 277/230 |
| 5,762,472 A | * | 6/1998 | Pizzi et al. | 415/135 |
| 6,162,014 A | * | 12/2000 | Bagepalli et al. | 415/170.1 |

* cited by examiner

Primary Examiner—Edward K. Look
Assistant Examiner—J. M. McAleenan

(57) ABSTRACT

The invention pertains to a seal element (1) for sealing a gas-path leakage-gap (5) between spaced apart first and second components (2,3) of a turbo machinery (22), which first and second components (2,3) having opposing inner and outer surfaces (9, 10) situated outside the leakage-gap (5). The seal element (1) comprises a generally gas impervious sealing member (4) and a layer (6) comprising ceramic fibers. The layer (6) covers at least partially said sealing element (1) and defines a sealing surface (21) for contacting outside the gap (5) the outer surfaces (10) of the first and second components (2,3) of the turbo machinery (22). The inventions further pertains to a combustion turbine (22), which comprises plurality of components (2,3) disposed in axial and circumferential direction, said components including guide-blade plates (12) of guide blades (16) and wall components (13), which are spaced apart in the circumferential direction or the axial direction by a leakage-gap (5) sealed off by a seal element (1).

21 Claims, 2 Drawing Sheets

SEAL ELEMENT FOR SEALING A GAP AND COMBUSTION TURBINE HAVING A SEAL ELEMENT

CROSS-REFERENCE TO RELATED APPLICATIONS

This application is based on and hereby claims priority to United Kingdom Application No. GB0108398.9, filed Apr. 4, 2001, the contents of which are hereby incorporated by reference.

FIELD OF THE INVENTION

The invention relates to a seal element for sealing a gap which may be formed between spaced-apart first and second components of a turbo machinery, in particular a combustion turbine. The invention also relates to a combustion turbine having a seal element.

BACKGROUND OF THE INVENTION

In industrial plants, particularly thermo-mechanical machines and chemical plants, in which different fluids are used, it may be necessary to keep those fluids separate from one another within the plants. For example, in thermal combustion power plants, flow regions of hot combustion gases have to be separated sealingly from flow regions of cooling gases of lower temperature. In gas turbine plants with high turbine inlet temperatures, for example of more than 1000.degree.C., thermal expansions of the individual components of the gas turbine plant occur, so that adjacent components are sometimes spaced from one another through the use of a gap in order to avoid high thermal stresses and the formation of cracks. Such gaps may constitute connections between flow regions of hot gases and flow regions of cold gases. It is advantageous to seal off the gap to reduce the inflow of cold gas into the flow region of hot gases so as not to thereby lower the temperature in the flow region of hot gases.

U.S. Pat. No. 3,341,172 and U.S. Pat. No. 2,991,045, each of which describes a gas turbine with an outer casing and a two-part inner casing, accordingly specify a sealing element that has a cross-section in the shape of an elongate C for sealing a gap between the two inner casings. An annular gap, through which cooling fluid is guided, is formed between the inner casing and the outer casing. The hot gas for driving the gas turbine flows within the inner casing.

U.S. Pat. No. 4,537,024 describes a gas turbine plant, in which components of a nozzle structure are sealed through the use of axial and radial sealing elements. The sealing elements are intended to prevent hot gas which flows through the nozzle structure from infiltrating into turbine regions outside the hot-gas duct. A sealing element can have approximately the shape of a squashed eight as seen in cross-section.

U.S. Pat. No. 5,975,844 describes in an assembly including two mutually thermally movable components each having a component groove located one opposite the other, a sealing element. This sealing element is directed along a main line for sealing a gap between the components. It comprises a first end, a second end opposite the first end and a middle region, in a cross-section substantially perpendicular to the main line, along a centre line, whereby the middle region is disposed between the ends and the sealing element having a toothed first surface.

U.S. Pat. No. 5,657,998 relates to a gas-path leakage seal for generally sealing a gas-path leakage-gap between spaced-apart first and second members of a gas turbine, in particular first and second segments of a gas turbine combustor casing. This seal comprises a generally imperforate foil-layer assemblage consisting essentially of materials selected from the group consisting of metals, ceramics, and polymers. This foil-layer is impervious to gas and it is disposed in the gas-part leakage-gap. The foil-layer assemblage having a first foil-layer with a lengthwise direction. The gas leakage seal further comprises a cloth-layer assemblage covering and contacting generally the entire first foil-assemblage outer surface and consisting essential of materials selected from the group consisting of metals, ceramics and polymers. Preferably the cloth-layer assemblage has two layers each have a thickness of about 10–25 microns. The cloth-layers each are woven cloth-layers and each comprises a high temperature, nickel-based superalloy, such as Inconel X-750. The seal assemblage is either fixed in grooves of adjacent parts of a gas turbine, or introduced in a U-shape flange of a combustor, or used in a twin-seal installation or in a multi-seal installation. In either case the seal fully lies within the leakage-gap, and provides a sealing effect either by contacting a surface within the gap, being inserted in a groove or contacts another seal assemblage. In comparison to a conventional metal rigid seal this seal with two foil-assemblages reduces the gas-path leakage from 2.4% to generally 1.0% according to U.S. Pat No. 5,657,998.

SUMMARY OF THE INVENTION

It is an object of the invention to provide a gas-path leakage seal element, in particular for a turbo machinery like a combustion turbine. It is a further object of the invention to provide a combustion turbine with a seal element. With the forgoing and other objects in view there is provided in accordance with the invention, a seal element for sealing a gas-path leakage-gap between spaced apart first and second components in particular of a turbo machinery. The first and second components having opposing inner and outer surfaces situated outside the leakage-gap. The seal element comprises a generally gas impervious sealing member and a layer comprising ceramic fibres, which layer at least partially covers the sealing element and defining a sealing surface for contacting outside the gap so that outer surfaces of set first and second components.

By virtue of the layer of ceramic fibres which form a flexible and deformable sealing portion a good sealing performance can be assured. The ceramic fibres can be used up to temperatures of about 1200 C. or even more. The seal element is therefore useable for sealing components of a turbo machinery, furnaces, burners or the like, which are exposed to hot gases. The sealing member improves the stiffness of the sealing element which ensures that the seal element does not break in parts and fall through the gap. Furthermore positioning the seal element outside the gap on the outer surfaces of the components has the advantage that the components itself do not have to be manufactured with grooves, recesses or the like and do not need to be thickened in the area of the gap for heat conducting purposes.

In accordance with another feature the layer comprises a ceramic fibre fabric, a ceramic fibre tape, a ceramic fibre sleeving or a ceramic fibre mat. The layer preferably itself is an object manufactured separately from the sealing member. It is put in contact with the sealing member for covering at least a portion of the sealing member after its own manufacturing. So it preferably provides a loose contact with the sealing member and is removable from the sealing member. In the latter case it could easily be replaced during maintenance of the turbo machinery by a new layer. In an embodiment in which the layer is provided as a sleeving the sealing member is introduced into the sleeving and so all surfaces of the sealing member is covered by the layer of ceramic fibres. It is also possible to provide a ceramic fibre layer tightly bounded to the sealing member.

In accordance with again another feature the sealing member essentially consists of a metal. Suitable metals are those who withstand high temperatures, for example high temperature steels like chromium steels or high temperature alloys on the basis of nickel or cobalt. The sealing member is preferable, flat and in particular is formed as sheet metal. It may comprise one or more flat members. The metal gives the sealing members on the one hand side a sufficient mechanical stiffness and on the other side sufficient elasticity so not to break in several portions when exposed to mechanical loads, e.g. pressure or force.

In accordance with a further feature said layer comprises ceramic fibres essentially consisting of a material like Zirconia ($ZrO_2$), Silica ($SiO_2$) or Alumina ($Al_2O_3$). It is understood that those ceramic materials could be combined and also be stabilised by other materials like Yttria ($Y_2O_3$). For example the ceramic fibres may essentially consist (in weight %) of 62.5% $Al_2O_3$, 24.5% $SiO_2$, 13% $B_2O_3$ with a crystal phase of Mullite-type and amorphous or solely amorphous; of 70% $Al_2O_3$, 28% $SiO_2$, 2% $B_2O_3$ with $\gamma$-$Al_2O_3$, Mullite and amorphous $SiO_2$; of 73% $Al_2O_3$, 27% $SiO_2$ with $\gamma$-$Al_2O_3$ and amorphous $SiO_2$, of 89% $Al_2O_3$, 10% $ZrO_2$, 1% $Y_2O_3$ with $\alpha$-$Al_2O_3$ and Yttria stabilised Zirconia; of 85% $Al_2O_3$ and 15% $SiO_2$ with $\alpha$-$Al_2O_3$ and Mullite; of >99% $Al_2O_3$ as $\alpha$-$Al_2O_3$. Such ceramic fibre materials are for example available from 3 M (Minnesota Mining and Manufacturing Company), St. Paul, Minn., USA under the Trademark of "Nextel". The manufacturing of ceramic fibres as well as the manufacturing of layers comprising ceramic fibres are know to those skilled in the art. Therefore a suitable layer comprising ceramic fibres fulfilling specified properties, in particular heat resistance up to over 1200 C. to about 1372 C., flexibility and other mechanical features may be chosen by those skilled in the art to provide a layer bounded to or just covering the sealing member. Other features like porosity and decree of gas perviousity can be provided in a predefined range.

In accordance with an added feature the seal element comprises a gap insertion portion for insertion into the gap, which is connected to the layer. This insertion portion may serve as a positioning means for positioning the seal element which was respect to the gap. It may further serve for providing an additional sealing effect. Preferably it extends over the width of the gap. And further preferably having either a cross-sectional shape so as to be deformable in the direction of the gap and/or having an internal structure so to be deformable. The insertion portion may have a loop like, circle like or bulged shape. It may be made of the same material as the layer or even be part of the layer.

In accordance with an additional feature the seal element comprises a fastening member. This fastening member may be permanently connected to the seal element, in particular to the sealing member or it may be removable connected to the seal element and only when introduced in a turbo machinery. The fastening member could be any appropriate means for fastening the seal element to the outer surfaces of the components. Preferably the seal element is loosely connected to the outer surfaces. The fastening member therefore comprises preferably a spring member, in particular a leaf spring. Such a spring member puts additional pressure on the seal element and causes the sealing surface to be in close contact with the outer surfaces and further assures that during operation of a turbo machinery the seal element is in a fixed position with respect to the outer surfaces of the components.

In accordance with yet another feature the seal element is positioned in a combustion turbine. The combustion turbine comprises a plurality of first and second components disposed in axial and circumferential direction, wherein at least first and second of the components are spaced apart in the circumferential direction or in the axial direction by a leakage-gap. Furthermore in the combustion turbine regions mutually separate by the components exist mainly regions including a hot gas region and a cooling gas region. The inner surfaces of the components are exposed to the hot gas region and the outer surfaces are exposed to the cooling gas region. The sealing surface of the seal element is placed on the outer surfaces to adjacent first and second components and thereby sealing the leakage gap. The seal element can be used to seal either a gap between first and second components in the axial direction or between first and second components in the circumferential direction. The seal element is pressed on the outer surfaces due to the higher pressure of the cooling gas compared to the lower pressure of the hot gas flowing in the hot gas region. To enlarge the pressure on the sealing element and so enlarge the sealing efficiency a fastening member puts an additional mechanical force on the seal element. As the seal element defines a sealing surface in contact with the outer surfaces of the components of the combustion turbine and only a small overlap of the sealing member with the outer surfaces exists a cooling of the components in the area of the gap is assured. Therefore the components at the gap may have the same thickness as in area far away from the gap. Furthermore no grooves, recesses or the like in the components are necessary for receiving and fixing the seal element.

In accordance with another object of the invention it is provided a combustion turbine which comprises a plurality of components disposed in axial and circumferential direction. The components include guide-blade plates off guide blades. Those guide-blade plates are also called shrouds. Other components are wall components which are also called components of a sealing ring. At least the first and the second components are spaced apart in the circumferential direction or in the axial direction by a leakage gap. Each of the components have an opposing inner and outer surface situated outside the leakage-gap. The combustion turbine further comprises regions mutually separated by the components wherein the regions include a hot-gas region and a cooling-gas region, wherein inner surfaces are exposed to the hot-gas region and the outer surfaces are exposed to the cooling-gas region and sealed off from the hot-gas region. A seal element having a generally gas impervious sealing member and a layer comprising ceramic fibres serves for sealing the leakage gap. The layer covering at least partially the seal element and defining a sealing surface, whereby the sealing surface is in contact with the outer surface of first and second components and thereby sealing the leakage gap. The seal element is pressed on the outer surfaces by the pressure difference between the high pressure cooling gas and the lower pressurised hot-gas. The seal element may further by fastened to the outer surfaces by an additional fastening member.

In accordance with yet a further feature the fastening member is disposed between a wall structure, also called casing, of the gas turbine and the outer surfaces of the components. The fastening member preferably presses the seal element on the outer surfaces.

In accordance with yet an added feature a combustion turbine comprises an impingement plate located in the cooling gas region between the wall structure and the outer surfaces. The fastening member is connected to the impingement plate on one side and to the seal element on the other side. The fastening member may comprise a spring member. Thus is of the spring type. The spring member may comprise a leaf spring.

Although the invention is illustrated and described herein as embodied in a seal element for sealing a gap and a combustion turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
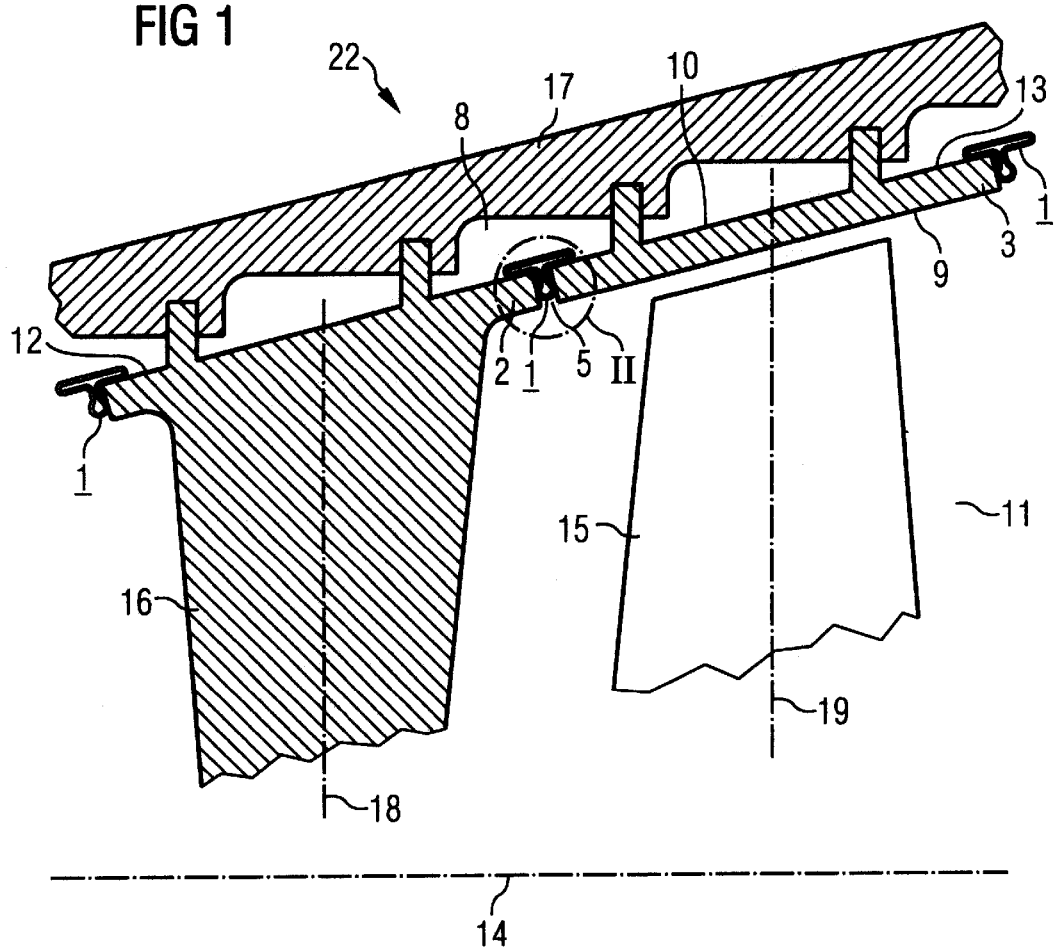
FIG. 1 is a fragmentary, diagrammatic, longitudinal-sectional view of a combustion turbine

Referring now to the figures of the drawings in detail and first, particularly, to FIG. 1 thereof, there is seen a combustion turbine (in the following also called gas turbine) 22 directed along a main axis 14. The gas turbine 22 has guide blades 16 and moving blades 15, alternating in the axial direction in a wall structure (in the following also called as casing) 17. The guide blades or vanes 16 are directed along an axis 18 perpendicular to the main axis 14 and are disposed along the circumference of the gas turbine 22 so as to form a circle. The guide blades 16 are each connected to the casing 17 of the gas turbine 22 through a guide blade plate 12. A guide blade plate 12 is also referred to as shroud or the sealing strip on turbine blades. Its purpose is to supply rigidity to the blades, lessen vibration and provide to some extend a sealing between stages.

Adjacent guide blades 16 are spaced from one another along the circumference through the use of a respective leakage gap 5 (see FIG. 2), with the result that they can essentially freely expand thermally. The guide-blade plate 12 separates a hot-gas region 11 formed about the main axis 14 of the gas turbine 22 from a cooling gas region 8 formed between the guide-blade plate 12 and the turbine casing 17. The moving blades 15 extend along a respective main axis 19 which is likewise essentially orthogonal to the main axis 14 of the gas turbine 22. The moving blades 15 lie completely within the hot-gas region 11. This hot-gas region 11 is separated from the cooling-air region 8 by a plurality of wall components 13, also called as components of a seal ring, along the circumference of the gas turbine 22. In this case, the wall components 13 are each adjacent the moving blades 15. The wall components 13 are connected to the turbine casing 17. For the sake of clarity, in each case only one guide blade 16, one moving blade 15 and one wall component 13 are shown. A respective wall component 13 is spaced from a respective guide blade 16, in particular from the guide-blade plate 12, in the axial direction through the use of a gap 5.

This gap 5 is sealed off by a seal element 1, thereby largely preventing a flow of cooling gas out of the cooling-gas region 8 into the hot-gas region 11 and preventing hot gas from flowing through the gap 5 in the cooling gas region 8. In this case, the guide blade plate 12 constitutes a first component 2 and the wall part 13 a second component 3. First and second components 2,3 each having a respective outer surface 10 directed to the cooling-gas region 8 and a inner surface 9 directed to the hot-gas region 11. The seal element 1 is put in close contact with the outer surfaces 10 of adjacent first and second components 2,3. The components 2,3 being movable thermally relative to one another. Thus, sealing-off of the cooling-gas region 8 from the hot-gas region 11 between adjacent guide blade plates 12 (shrouds) and wall components 13 takes place in a axial direction and, in each case, sealing-off between two adjacent guide blade plates 12 and correspondingly between two adjacent wall components 13 takes place in a circumferential direction.

Figure 2:
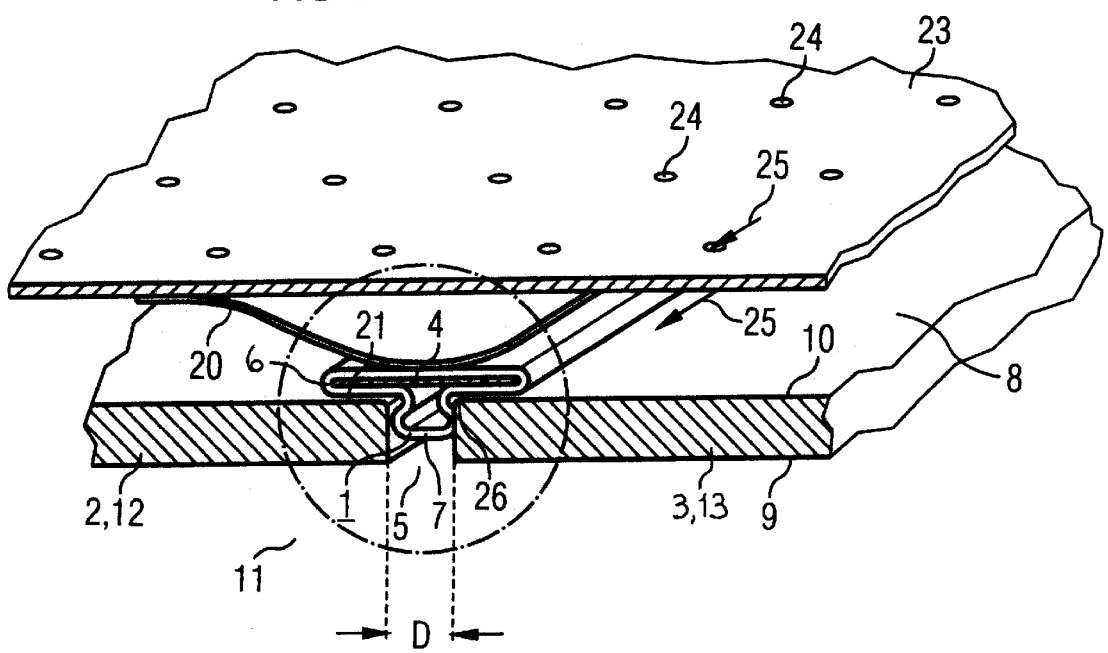
FIG. 2 is a further enlarged, fragmentary, view of a portion II of FIG. 1 showing a seal element in a combustion turbine.

FIG. 2 shows an enlarged cross-sectional view of the area indicated in FIG. 1 with a seal element 1 positioned between an impingement plate 23 and first and second components 2,3. The seal element 1 serves for sealing off a gap 5 having a width D in the axial direction of the gas turbine 22 between a first component 2 which is a guide blade plate 12 and a second component 3 which is a wall component 13 of the gas turbine 22. The seal element 1 comprises a sealing member 4, which is generally gas impervious. This sealing member 4 is a flat member, in particular a metal strip formed from a sheet metal. The width of the metal strip is greater than the width D of the gap 5. The sealing member 4 gives the seal element 1 a good mechanical stiffness and elasticity, so that it also withstands high-pressure loads and the risk of breaking into parts and falling through the gap is avoided. The metal chosen is preferably a heat resisting steel or a high temperature NiCr alloy. The sealing member 4 is covered on all sides with a layer 6 comprising ceramic fibres. The layer 6 of ceramic fibres is made of a sleeving of ceramic fibres in which sleeving the seal member 4 is introduced. The layer 6 of ceramic fibres defines a flexible and deformable sealing surface 21. The sealing member 4 is put with its sealing surface 21 in close contact with both the outer surfaces 10 of adjacent first and second components 2,3, so that the ceramic fibres are pressed on the outer surfaces 10 for sealing off the gap 5. The fibres consist preferably of a mixture of silica $SiO_2$ and alumina $Al_2O_3$, for example (in weight %) of 73% $Al_2O_3$ and 27% $SiO_2$ with $\gamma$-$Al_2O_3$ and amorphous $SiO_2$.

The seal element 1 further comprises a insertion portion 7, which is connected to the sealing surface 21 and extends into the gap 5. The insertion portion forms a sort of bulge and has in a cross sectional view a loop-like shape, so to extend over the width D of the gap 5. It is made from the same material as the layer 6 and it is due to its shape as well as due to the flexible and elastically fibre structure deformable. Any lateral movement of the components 2,3 due to heat expansion or shrinking could therefore be compensated by the insertion portion 7. It also serves for sealing off the gap 5 and positioning the seal element 1 with respect to the gap 5.

The seal element 1 is pressed on the outer surfaces 10 by the cooling gas fed in the cooling gas region 8. The pressure of the cooling gas 25 is higher than the pressure of the hot gas (not shown), which flows through the turbine 22 in the hot gas region 11. Therefore a pressure difference exists which causes the seal element 1 to be pressed on the outer surfaces 10.

In the cooling gas region 8, the impingement plate 23 is positioned having apertures 24, in particular bores, through which cooling gas 25 is fed to the components 2,3 for cooling purpose. Between the impingement plate 23 and the seal element 1 a fastening member 20 is foreseen. This fastening member 20 is at one side connected to the impingement plate 23 and on the other side connected to the seal element 1. The fastening member 20 has the shape of a leaf spring with its cambered part in contact with the seal element 1. Thus the fastening member 20 increases the pressure exposed on the seal element 1 so improving the sealing efficiency and fixing the position of the seal element 1.

The components 2,3 have rounded edges leading from the gap 5 to the outer surfaces 10, which facilitates the insertion of the insertion portion 7 into the gap 5 and reduces the possibility of damaging and thus reducing the efficiency of the seal element 1. The seal element 1 covers only a small portion of the outer surfaces 10 so that still an efficient cooling of the components 2,3 by the cooling fluid 25 even at the edges 26 is maintained. No special construction of the components 2,3 close to the gap 5, for example a thickening of the component 2,3 near the gap 5 for heat conducting purposes is necessary.

I claim:

1. A seal element for sealing a gas-path leakage-gap with approximately flat contours between spaced apart first and second components of a turbo machinery, which first and second components having opposing inner and outer surfaces situated outside the leakage-gap, said seal element comprising:
   a) a generally gas impervious sealing member, and
   b) a layer comprising ceramic fibres and covering at least partially said sealing element and defining a sealing surface for contacting inside said gap said outer surfaces of said first and second components of said turbo machinery.

2. The seal element of claim 1, wherein said layer is formed from a material selected from the group consisting of a ceramic fibre fabric, a ceramic fibre tape, a ceramic fibre sleeving, and a ceramic fibre mat.

3. The seal element of claim 1, wherein said layer is loosely connected to said sealing member.

4. The seal element of claim 1, wherein said sealing member comprises a sheet metal.

5. The seal element of claim 1, wherein in said layer comprises ceramic fibres consisting of $ZrO_2$, $SiO_2$, $Al_2O_3$.

6. The seal element of claim 1, further comprising a gap insertion portion connected to said layer for insertion in said gap.

7. The seal element of claim 6, wherein said gap insertion portion comprises ceramic fibres.

8. The seal element of claim 6, wherein said gap insertion portion extends over the width of said gap.

9. The seal element of claim 8, further comprising a fastening member for pressing said layer on said outer surfaces of said components of said turbo machinery.

10. The seal element of claim 9, wherein said fastening member comprises a leaf spring.

11. The seal element of claim 6, wherein said gap insertion portion in a cross-section has a shape so as to be deformable in the direction of the width of the gap.

12. The seal element of claim 11, wherein said gap insertion portion in a cross-section has a loop-like shape.

13. A combustion turbine, comprising:
    a plurality of components disposed in axial and circumferential direction, said components including guide-blade plates of guide blades and wall components, at least a first and a second of said components spaced apart in the circumferential direction or the axial direction by a leakage-gap with approximately flat contours, and each of said components having opposing inner and outer surfaces situated outside the leakage-gap;
    regions mutually separated by said components, said regions including a hot-gas region and a cooling-gas region, wherein said inner surfaces are exposed to the hot-gas region and said outer surfaces are exposed to the cooling-gas region and sealed off from said hot-gas region;
    a seal element having a gas impervious sealing member, and a layer comprising ceramic fibres, said layer covering at least partially said seal element and defining a sealing surface, said sealing surface being in contact with the inside of the gap and said outer surfaces of said first and second components thereby sealing said leakage gap.

14. The combustion turbine of claim 13, comprising a wall structure surrounding said first and second components further comprising a fastening member disposed between said wall structure and said outer surfaces to press said seal element on said outer surfaces.

15. The combustion turbine of claim 14, comprising an impingement plate located in the cooling gas region between said wall structure and said outer surfaces, with said fastening member connected to said impingement plate.

16. The combustion turbine of claim 14, wherein said fastening member comprises a leaf spring.

17. A combustion turbine, comprising:
    a first and a second component, spaced apart by a leakage gap with approximately flat contours. said first and said components having an inner surface and an outer surface;
    a hot-gas region and a cooling-gas region, separated by said first and second components such that said inner surfaces are exposed to said hot-gas region and said outer surfaces are exposed to said cooling-gas region;
    a seal element having a layer covering at least partially said seal element to define a sealing surface, and said seal element having a gap insertion portion that is deformable in the direction of the width of said leakage gap, wherein said sealing surface is in contact with the inside of the gap and said outer surfaces of said first and second components to seal said leakage gap.

18. The combustion turbine of claim 17, wherein said layer of said seal element is formed from a material selected from the group consisting of a ceramic fibre fabric, a ceramic fibre tape, a ceramic fibre sleeving and a ceramic fibre mat.

19. The combustion turbine of claim 17, wherein said gap insertion portion extends over the width of said gap.

20. The combustion turbine of claim 17, further comprising a fastening member for pressing said layer on said outer surfaces of said components of said turbo machinery.

21. The combustion turbine of claim 20, wherein said fastening member comprises a leaf spring.

* * * * *